(12) United States Patent
Pirija

(10) Patent No.: US 10,500,979 B1
(45) Date of Patent: Dec. 10, 2019

(54) CHARGING SYSTEM UTILIZING EXCESS GRID ELECTRICITY

(71) Applicant: Suljo Pirija, West New York, NJ (US)

(72) Inventor: Suljo Pirija, West New York, NJ (US)

( * ) Notice: Subject to any disclaimer, the term of this patent is extended or adjusted under 35 U.S.C. 154(b) by 426 days.

(21) Appl. No.: 15/639,680

(22) Filed: Jun. 30, 2017

(51) Int. Cl.
*B60L 53/63* (2019.01)
*H02J 7/00* (2006.01)
*B60L 53/14* (2019.01)

(52) U.S. Cl.
CPC .............. *B60L 53/63* (2019.02); *B60L 53/14* (2019.02); *H02J 7/007* (2013.01); *H02J 7/0021* (2013.01); *H02J 7/0045* (2013.01)

(58) Field of Classification Search
CPC .......... B60L 53/63; B60L 53/60; B60L 53/10; B60L 53/67; H02J 7/0013; H02J 7/0021; H02J 7/0027; H02J 2003/003; H02J 7/0018; G05B 2219/40458; G05F 1/66; Y04S 50/10; G01R 31/086; G01R 31/371
USPC ........................................................ 320/109
See application file for complete search history.

(56) References Cited

U.S. PATENT DOCUMENTS

| | | | | |
|---|---|---|---|---|
| 3,748,395 A | * | 7/1973 | Herter | H04M 1/515 379/380 |
| 8,143,856 B2 | | 3/2012 | Andrea et al. | |
| 9,026,347 B2 | * | 5/2015 | Gadh | H02J 3/14 701/123 |
| 9,043,038 B2 | | 5/2015 | Kempton | |
| 9,352,661 B2 | | 5/2016 | Keeling et al. | |
| 9,401,610 B2 | | 7/2016 | Uyeki | |
| 2009/0184835 A1 | * | 7/2009 | Deaver, Sr. | G08B 25/06 340/660 |
| 2013/0141040 A1 | * | 6/2013 | DeBoer | H02J 3/14 320/109 |

FOREIGN PATENT DOCUMENTS

| | | |
|---|---|---|
| WO | WO2011102857 | 8/2011 |
| WO | WO2014179080 | 11/2014 |
| WO | WO2015135911 | 9/2015 |

* cited by examiner

*Primary Examiner* — Drew A Dunn
*Assistant Examiner* — Harry O'Neill-Becerril
(74) *Attorney, Agent, or Firm* — Goldstein Law Offices, P.C.

(57) ABSTRACT

An electric vehicle charging system, for use with an electric grid having live conductors including a charging conductor, and a neutral conductor. The electric grid has a grid usage level and a grid capacity. The charging system includes a plurality of stages that each include a battery charger for charging an electric vehicle battery, a controller, and a charging relay. A current sensing unit inductively measures the current on the charging conductor and provides a sensed current to the controllers. When the grid usage level is low the battery chargers on all stages are active. As the grid usage increases toward peak usage, in response to an increase in the sensed current, the controllers consecutively deactivate the battery chargers at predetermined threshold levels.

12 Claims, 6 Drawing Sheets

CHARGING SYSTEM UTILIZING EXCESS GRID ELECTRICITY

TECHNICAL FIELD

The present disclosure relates generally to a charging system. More particularly, the present disclosure relates to a system for charging electric vehicle batteries automatically at times of low electric grid usage.

BACKGROUND

The replacement of internal combustion vehicles with electric vehicles is occurring more rapidly than anyone had expected. Clearly modern electric vehicles direct pollution through vehicle emissions. The electricity used to charge them, however, must come from the electric grid. While sustainable sources such as wind and hydroelectric power supply part of our overall electric needs, the reality is that when extra electricity is needed, fossil fuel sources will be used. Thus, charging electric vehicles at peak demand times will often lead to additional demand, and thus additional air pollution and fossil fuel depletion.

While certain generating systems will adjust according to the present demand on the grid, not all systems can adapt so readily. Sustainable sources such as solar, wind and hydroelectric power systems in particular, do not adapt so readily. The sun will not stop shining, nor will the wind stop blowing, simply because there is less demand for electricity. Thus, there will be an excess of available energy electricity that is simply not harnessed or used.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for maximizing electric grid usage and avoiding wasted grid capacity. Accordingly, the present disclosure provides a charging system that seeks to utilize spare grid capacity to charge electric vehicle batteries when grid usage is at lower levels.

It is another aspect of an example embodiment in the present disclosure to provide a system that automatically determines grid usage and appropriately adjusts its charging activities. Accordingly, the charging system is provided in multiple stages. Each stage has a battery charger connected to an electric vehicle battery. All chargers are active at times of low grid usage. As grid usage increases, the battery chargers are consecutively deactivated at predetermined threshold levels.

It is a further aspect of an example embodiment in the present disclosure to provide a system that is readily scalable for large-scale use. Accordingly, the charging system may be employed along major transportation routes, in conjunction with available electric grid resources. The system is designed to utilize excess grid electricity/capacity wherever it is available.

Accordingly, the present disclosure describes an electric vehicle charging system, for use with an electric grid having live conductors including a charging conductor, and a neutral conductor. The electric grid has a grid usage level and a grid capacity. The charging system includes a plurality of stages that each include a battery charger for charging an electric vehicle battery, a controller, and a charging relay. A current sensing unit inductively measures the current on the charging conductor and provides a sensed current to the controllers. When the grid usage level is low the battery chargers on all stages are active. As the grid usage increases toward peak usage, in response to an increase in the sensed current, the controllers consecutively deactivate the battery chargers at predetermined threshold levels.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
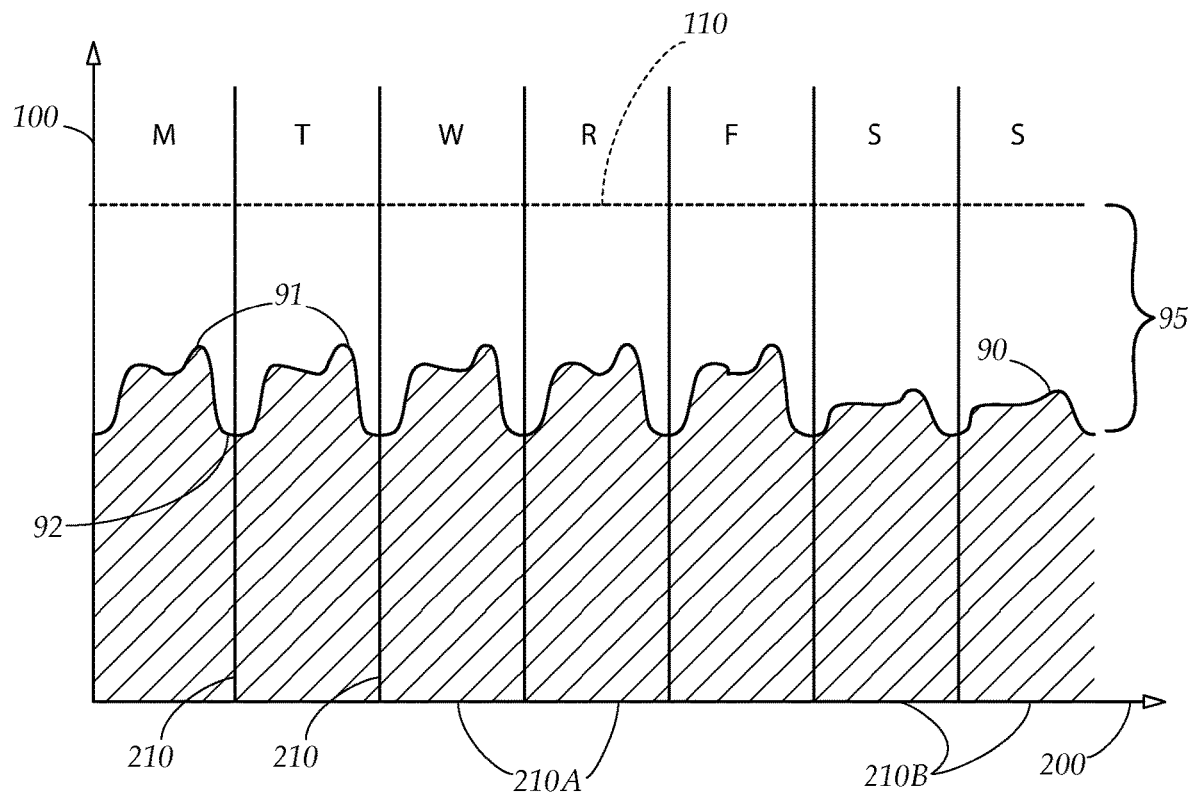
FIG. 1 is a graphical illustration, providing an example of excess available energy, as a function of time, over a period of one week.

FIG. 1 provides a graphical illustrating grid electricity usage 90 on a vertical axis 100, and time on horizontal axis

200. Note that the time period indicated on the graph is a week, divided into seven days 210. Also indicated on the graph is the available grid electricity 110. Note that in this illustration, the available grid electricity 110 is constant. Between the available grid electricity 110 and grid electricity usage 90 is unused capacity 95. As illustrated, the grid electricity usage 90 fluctuates considerably during the day. In particular, it generally hits peak usage 91 during daytime hours, and hits low usage 92 during nighttime hours. Accordingly, unused capacity 95 is generally higher during nighttime hours than during daytime hours. But even during such periods, there is significant fluctuation of usage 90, and thus there is fluctuation of unused capacity 95. There is even more fluctuation between weekdays 210A and weekend days 210B. Thus, solutions that utilize timers to attempt to harness unused electricity would produce unsatisfactory results.

Figure 2:
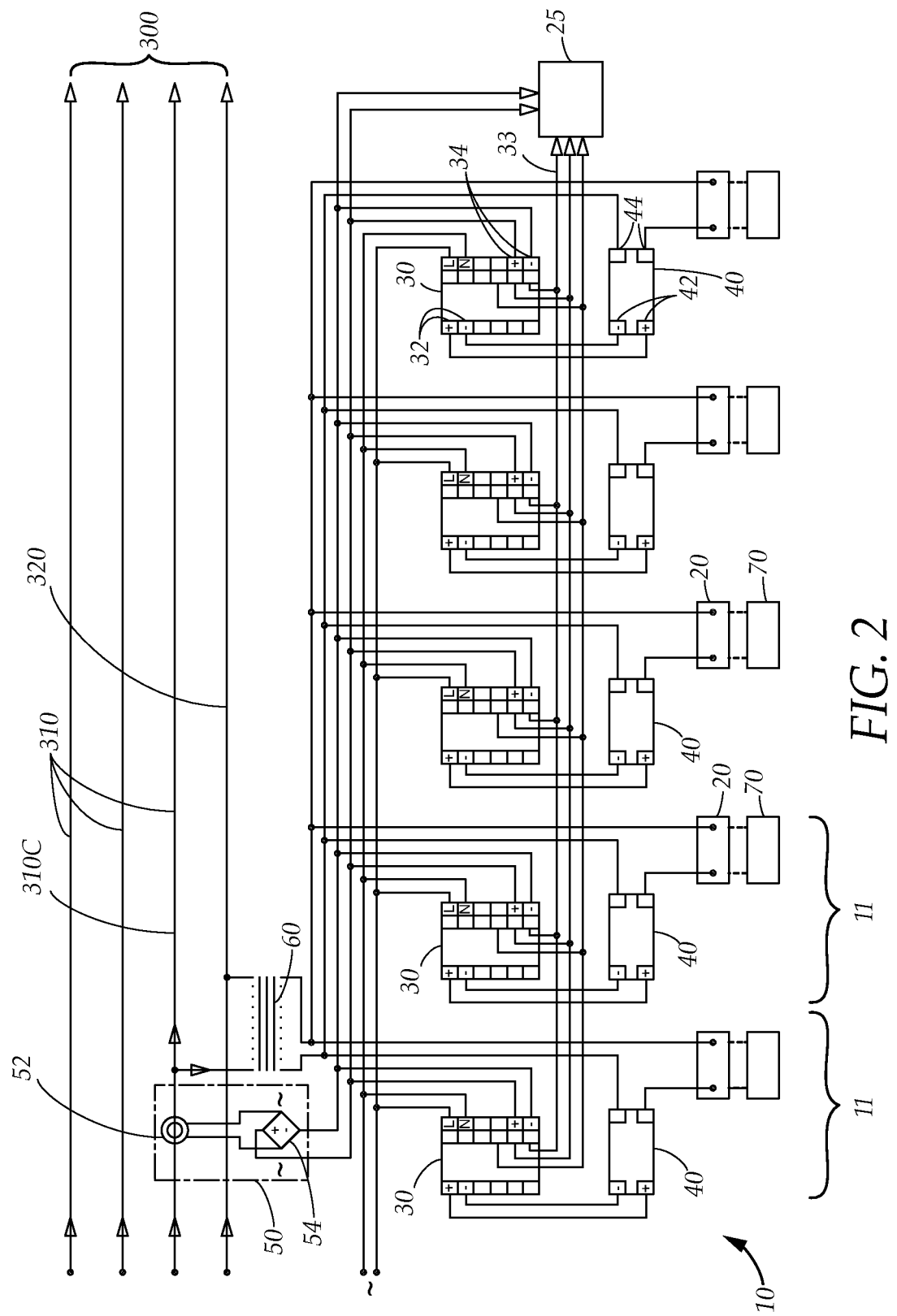
FIG. 2 is a schematic diagram, illustrating the functional interconnection of various components of the charging system described herein.

Accordingly, FIG. 2 illustrates a charging system 10 that seeks to utilize unused electricity on a power grid 300 for charging electric vehicle batteries 70. The power grid 300 includes a plurality of live conductors 310 and a neutral conductor 320. As illustrated, the live conductors 310 may represent distinct phases in a conventional three phase system, in which electricity is supplied as three phases that are one hundred twenty degrees out of phase from each other.

The charging system 10 also includes several stages 11, each stage having a battery charger 20, a controller 30, and a charging relay 40. The charging system also includes a current sensing unit 50 and a step down transformer 60. As indicated, each battery charger 20 is selectively coupled to one of the electric vehicle batteries 70 and is enabled when grid electricity usage is sufficiently low (as described in detail hereinbelow) to charge that battery 70.

In accordance with the principles of the present disclosure, each controller 30 is configured to deactivate the battery charger 20 associated with its stage 11 when usage exceeds a preset level set with each controller. In particular, the charging relay 40 associated with each stage 11 has a coil 42 and a pair of poles 44. The charging relay 40 may be configured to be normally closed, such that the poles 44 are typically connected, but when the coil 42 is energized the poles 44 are disconnected from each other.

In particular, the step down transformer 60 has a primary input that is connected to one of the live conductors 310, which we will arbitrarily refer to as a charging live conductor 310C herein. The primary input of the step down transformer 60 is also connected to the neutral conductor 320. The step down transformer has a secondary output that is connected to the battery charger 20 through the poles 44 of the charging relay 40. Accordingly, the step down transformer 60 supplies an appropriate voltage to the battery charger 20 when the poles 44 of the relay are closed. When the coil 42 is energized, however, power from the step down transformer 60 is disconnected from the battery charger 20.

The charging relay 40 operates under the control of the controller 30. In particular, for each stage 11, the controller 30 has an enabling output 32 that is connected to the coil 42 of the charging relay 40 for that stage. The controller 30 sends an enabling signal on the enabling output 32 in accordance with its internal programming, and in response to the current sensing unit 50. In particular, the current sensing unit 50 has an inductive loop 52 that encircles the charging live conductor 3100, such that a sensed current (and an associated voltage) is magnetically induced in the inductive loop 52 in proportion to electricity flowing through the charging live conductor 310C without electric connection between the current sensing unit 50 and the charging live conductor 3100. The sensed current is rectified into a DC signal by a bridge rectifier 54, and this DC sensed current is provided to the controller 30 of all stages 11. While the sensed current sought by the current sensing unit 50 is a measure of the electrical current in the charging live conductor 3100 so as to measure electric grid usage thereon, the DC sensed current may actually be measured and considered as a voltage that is generally of the order of several hundred millivolts. In particular, each controller has a sensing input 34 that receives the DC sensed current, and is sensitive enough to measure and respond appropriately to the low voltages thereof.

Figure 6:
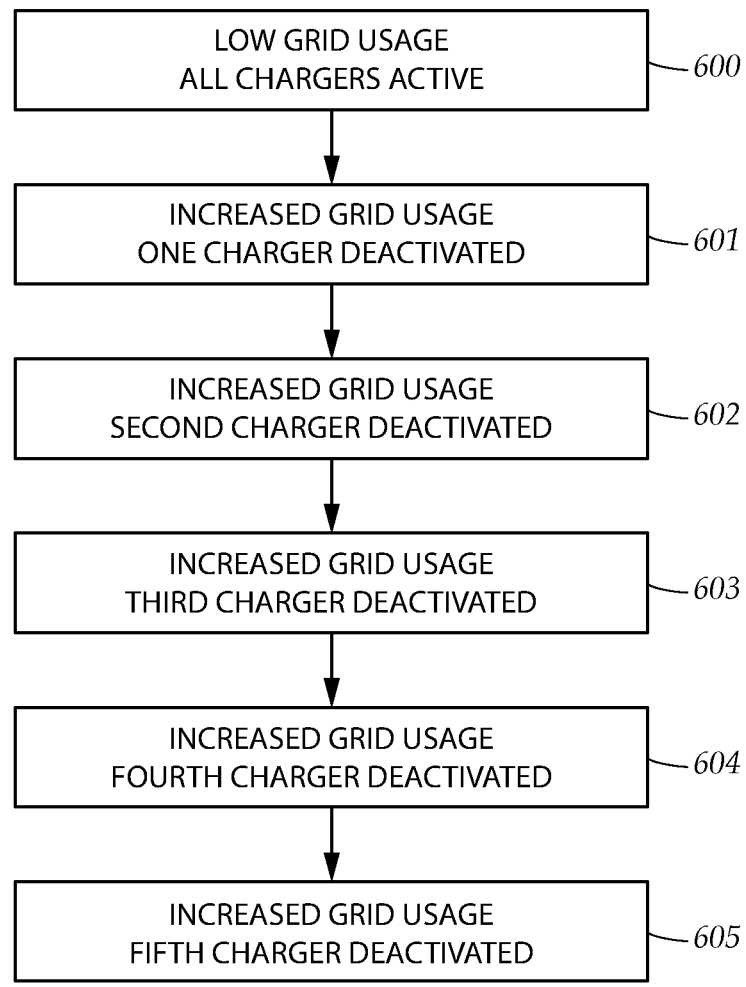
FIG. 6 is a flow diagram, illustrating operational steps according to the charging system of the present disclosure.

The charging system 10 is configured to selectively allow charging of the different stages 10 in accordance with usage on the power grid. In particular, when usage is sufficiently low, all battery chargers are enabled. As usage on the power grid increase, the battery chargers 20 are consecutively disabled at different predetermined threshold levels. When usage on the power grid is peak usage, all battery chargers 20 are disabled. Accordingly, the charging system 10 is configured to efficiently utilize and take advantage of unused capacity/electricity on the grid. Referring to FIG. 6, which illustrates operation of a system having at least five chargers, initially, at periods of low grid usage all battery chargers are active 600. When the grid usage increases, one of the chargers is deactivated 601. When the grid usage further increases, a second charger is deactivated 602. When the grid usage increases even further, a third charger is deactivated 603. When the grid usage increases still further, a fourth charger is deactivated 604. When the grid usage increases yet further, a fifth charger is deactivated 605.

During peak usage on the grid, the DC sensed current is considered the peak usage measured current. The peak usage measured current is used to determine when to deactivate each of the stages. In particular, a step level is the threshold level where the stages are consecutively deactivated at the peak usage measured current divided by the number of stages. Each consecutive deactivation occurs at a multiple of the step level.

For example, if the DC sensed current is 500 mV during peak usage, representing the peak usage measured current, and the charging system 10 has five stages 11 (referring again to FIG. 2), as illustrated, the charging system 10 will deactivate one of the stages when the DC sensed current reaches 100 mV; will deactivate a second stage when the DC sensed current reaches 200 mV; will deactivate a third stage when the DC sensed current reaches 300 mV; will deactivate a fourth stage when the DC sensed current reaches 400 mV; and will deactivate the fifth stage when the DC sensed current reaches 500 mV. The controllers of each of the stages 11 are programmed accordingly, so that they provide an enabling signal on their enabling output(s) 32 when the DC sensed current reaches the appropriate predetermined threshold level to deactivate charging of that stage.

The system also has a tracking computer 25, which is configured to track activities within the system 10, including when the battery chargers 20 in each stage are active and also the grid usage. Accordingly, the tracking computer 25 is connected to the bridge rectifier 54 to record the DC sensed current, and is also connected to a logic bus 33 that is connected between the controller 30 of the various stages 11 and the tracking computer 25, to register and record activity of the controllers 30 to enable and disable the battery chargers 20 alongside the DC sensed current. Accordingly, data is accumulated by the tracking computer 25 that can be used to determine how fully the batteries are being charged, when charging is complete, and thereby determining efficiency in the current arrangement, programming, and configuration of the controllers and chargers. Accordingly, with such information, decisions can be made whether additional charging systems 10 should be installed in a given location, or whether the triggering current levels should be modified to better utilize the available grid electricity.

Note that the system as illustrated is connected to one of the live conductors 310, which serves as the charging live conductor 310C. The system of FIG. 2 is preferably triplicated, such that the arrangement shown, each having several stages 11 as illustrated is provided for each of the live conductors 310, such that each live conductor 310 serves as the charging live conductor 3100 for one of the three total systems that each include its own current sensing unit 52 and stages 11. For each of said "systems", the stages 11, including their associated controllers 30, battery chargers 20, and charging relays 40 are connected to their associated charging live conductor 3100 through its own step down transformer 60, and employs its own current sensing unit 52 to measure usage in its charging live conductor 310C. Note that when the electric grid is in industrial locales, these three systems will often operate in concert, since usage on the three phases will typically be nearly the same. In residential locales, however, grid usage may vary due to significant and inconsistent use of single phase electricity by residential customers.

Figure 3:
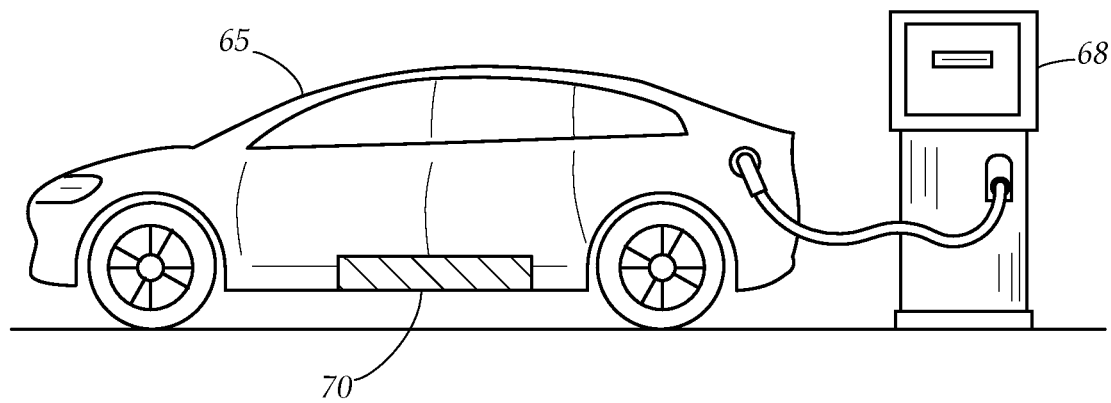
FIG. 3 is a side elevational view, illustrating conventional charging of an electric vehicle.
Figure 4:
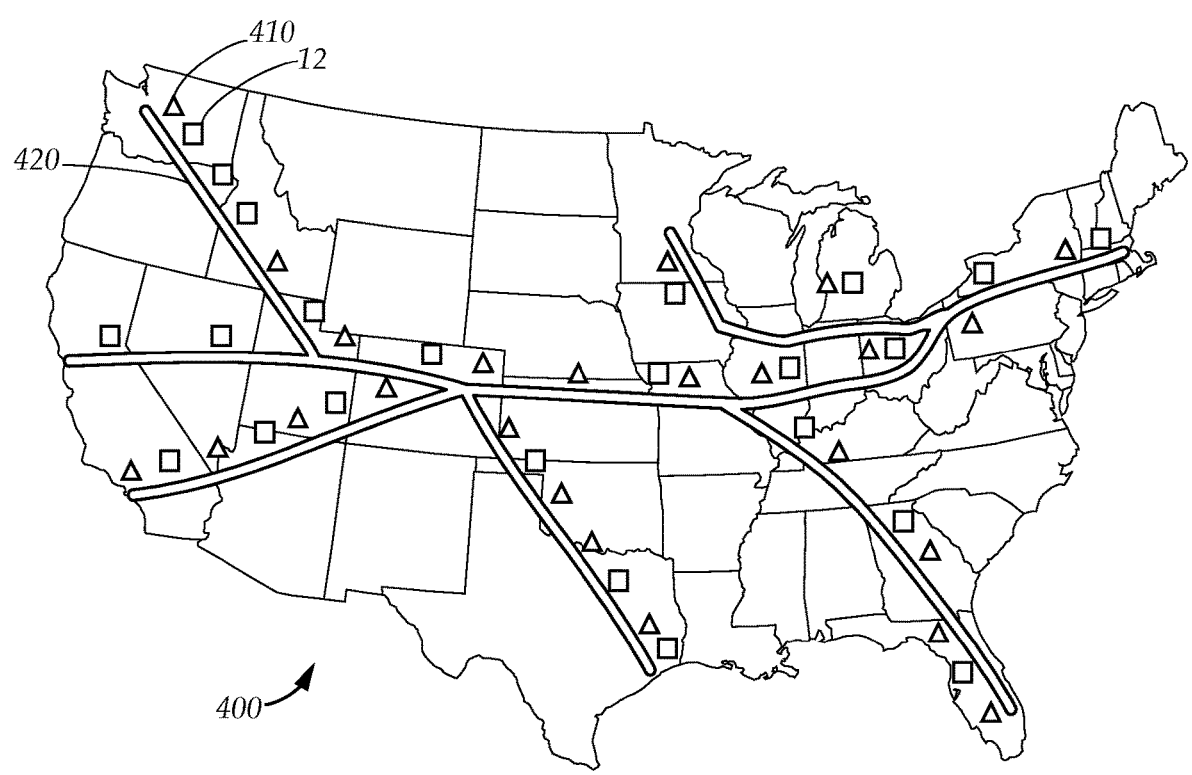
FIG. 4 is a graphical illustration, showing a network of power generation and charging facilities along transportation routes.
Figure 5A:
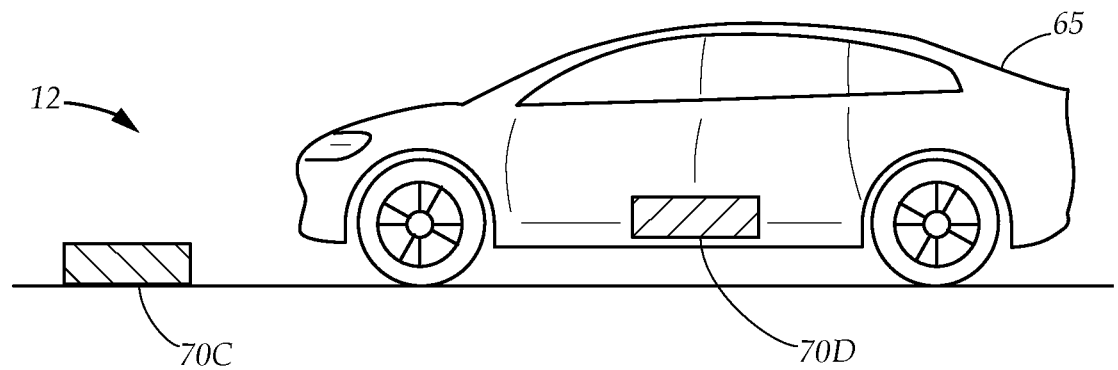
FIGS. 5A and 5B are side elevational views, illustrating the exchange of a depleted battery with a charged battery within an electric vehicle.
Figure 5B:
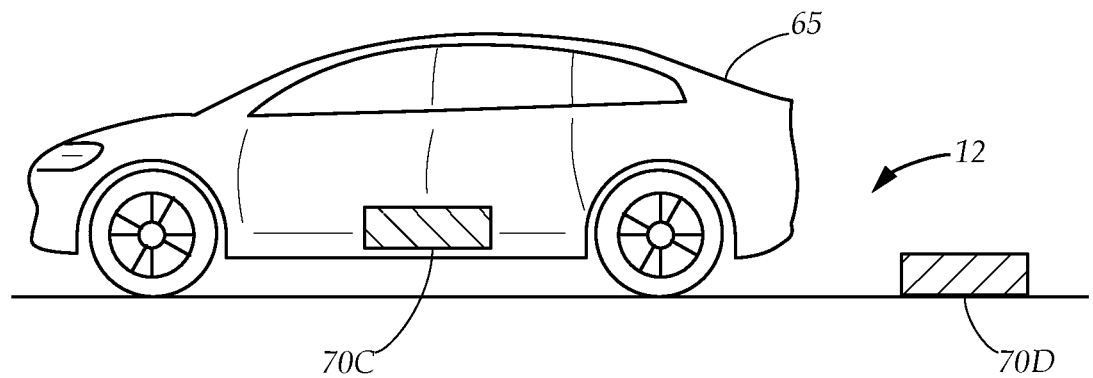

Referring to FIG. 3, most conventional electric vehicles 65 are charged at a charging station 68, such that the battery 70 is fixed within the vehicle 65. The battery 70 may remain with the vehicle 65 for the lifetime of the vehicle, only to be replaced if/when it degrades significantly. Referring to FIGS. 5A and 5B, however, using the charging system described herein, at a charging location 12, a depleted battery 70D may be removed from a vehicle, and replaced with a charged battery 70C. Since the battery chargers of the charging system as described hereinabove are configured to charge when grid usage favors doing so, having a charging station that charges removable batteries, rather than fixed batteries within a vehicle, is most compatible with this charging system. As illustrated in FIG. 4, a coast-to-coast transportation network 400 can be created by leveraging the *nexus* between generating plants 410, charging stations 12, and main highways 420. Accordingly, by locating the charging stations 12 near the generating plants 410, usage and appropriate build out of charging facilities (including the optimal number of battery chargers/stages) allows charged batteries to be readily available to electric vehicles being used to transport goods and people throughout the nation.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a charging system for utilizing excess grid electricity for charging electric vehicle batteries. The disclosure is illustrated by example in the drawing figures, and throughout the written description. It should be understood that numerous variations are possible, while adhering to the inventive concept. Such variations are contemplated as being a part of the present disclosure.

What is claimed is:

1. A charging system, for charging electric vehicle batteries, comprising:
   an electrical grid, having three live conductors and one neutral conductor, one of said live conductors is designated the charging live conductor, the electrical grid having a grid usage level, a peak usage level, and a grid capacity;
   a current sensing unit having an inductive loop that encircles the charging live conductor such that a sensed current is magnetically induced in the inductive loop in proportion to electricity flowing through the charging live conductor, the current sensing unit also having a bridge rectifier for producing a DC sensed current from the sensed current;
   a plurality of stages connected to the charging live conductor, each stage having a battery charger, each battery charger adapted to connect to and charge one of the electric vehicle batteries, each stage further having a charging relay having poles and a coil, the poles of the charging relay selectively connecting the battery charger to the live conductor, and a controller connected to the DC sensed current and having an enabling output connected to the coil of said relay, the controller providing an enabling output to energize the coil and disconnect the charger from the live conductor when the DC sensed current reaches a predetermined threshold, wherein the predetermined threshold for each of the stages is different so battery charging occurs on all of the battery chargers when grid usage level is low and that the battery chargers associated with the different stages are consecutively deactivated as the grid usage level increases.

2. The charging system as recited in claim 1, further comprising a step down transformer having a primary input connected to the charging live conductor and the neutral conductor, and a secondary output selectively connected to the battery chargers through their associated charging relays.

3. The charging system as recited in claim 2, wherein the battery chargers are all active when the DC sensed current measures 0 mV, all deactivated at a peak usage sensed current, and are consecutively deactivated in steps equal to the peak usage sensed current divided by the number of stages.

4. The charging system as recited in claim 2, wherein the plurality of stages further comprises at least five stages, wherein a peak usage sensed current is measured by the current sensing unit during peak usage of the electrical grid, wherein a step level is the peak usage sensed current divided by the number of stages, wherein the battery charger for one of the stages is deactivated when the sensed current is the step level, the battery charger for another of the stages is deactivated when the sensed current is at two times the step level, the battery charger for another of the stages is deactivated when the sensed current is at three times the step level, the battery charger for another of the stages is deactivated when the sensed current is at four times the step level, and the battery charger for another of the stages is deactivated when the sensed current is at five times the step level.

5. The charging system as recited in claim 4, further comprising a tracking computer, connected to the bridge rectifier and to the controllers, for measuring the DC sensed current and tracking activation and deactivation of the controllers alongside the DC sensed current.

6. The charging system as recited in claim 2, wherein the current sensing unit and plurality of stages as recited is triplicated, wherein each such current sensing unit and plurality of stages is provided for each of the live conductors such that one of said live conductors serves as the charging live conductor for its associated current sensing unit and plurality of stages.

7. A charging system, for charging electric vehicle batteries using an electrical grid, having three live conductors and one neutral conductor, the electrical grid having a grid usage level, a peak usage level, and a grid capacity, comprising:
a current sensing unit having an inductive loop that is adapted to encircle one of the live conductors, designated as a charging live conductor, such that a sensed current is magnetically induced in the inductive loop in proportion to electricity flowing through the charging live conductor;
a step down transformer having a primary input adapted to connect to the charging live conductor and the neutral conductor, and a secondary output selectively connected to the battery chargers through their associated charging relays;
a plurality of stages connected to the secondary output, each stage having a battery charger, each battery charger adapted to connect to and charge one of the electric vehicle batteries, each stage further having a charging relay having poles and a coil, the poles of the charging relay selectively connecting the battery charger to the live conductor, and a controller connected to the sensed current and having an enabling output connected to the coil of said relay, the controller providing an enabling output to energize the coil and disconnect the charger from the live conductor when the sensed current reaches a predetermined threshold, wherein the predetermined threshold for each of the stages is different so battery charging occurs on all of the battery chargers when grid usage level is low and that the battery chargers associated with the different stages are consecutively deactivated as the grid usage level increases.

8. The charging system as recited in claim 7, wherein the current sensing unit, step down transformer, and plurality of stages as recited is triplicated, wherein each such current sensing unit and plurality of stages is provided for each of the live conductors such that one of said live conductors is adapted to serve as the charging live conductor for its associated current sensing unit and plurality of stages.

9. The charging system as recited in claim 8, wherein the current sensing unit also having a bridge rectifier for producing a DC sensed current from the sensed current.

10. The charging system as recited in claim 9, wherein the battery chargers are all active when the DC sensed current measures 0 mV, all deactivated at a peak usage sensed current, and are consecutively deactivated in steps equal to the peak usage sensed current divided by the number of stages.

11. The charging system as recited in claim 9, wherein the plurality of stages further comprises at least five stages, wherein a peak usage sensed current is measured by the current sensing unit during peak usage of the electrical grid, wherein a step level is the peak usage sensed current divided by the number of stages, wherein the battery charger for one of the stages is deactivated when the sensed current is at the step level, the battery charger for another of the stages is deactivated when the sensed current is at two times the step level, the battery charger for another of the stages is deactivated when the sensed current is at three times the step level, the battery charger for another of the stages is deactivated when the sensed current is at four times the step level, and the battery charger for another of the stages is deactivated when the sensed current is at five times the step level.

12. The charging system as recited in claim 11, further comprising a tracking computer, connected to the bridge rectifier and to the controllers, for measuring the DC sensed current and tracking activation and deactivation of the controllers alongside the DC sensed current.

* * * * *